United States Patent
Burnes

(10) Patent No.: US 11,635,754 B1
(45) Date of Patent: Apr. 25, 2023

(54) HIGH-VELOCITY MOBILE IMAGING SYSTEM

(71) Applicant: Flux Dynamics, LLC, Atlanta, GA (US)

(72) Inventor: Derek D. Burnes, Atlanta, GA (US)

(73) Assignee: FLUX DYNAMICS, LLC, Atlanta, GA (US)

( * ) Notice: Subject to any disclaimer, the term of this patent is extended or adjusted under 35 U.S.C. 154(b) by 568 days.

(21) Appl. No.: 16/680,767

(22) Filed: Nov. 12, 2019

Related U.S. Application Data

(60) Provisional application No. 62/767,787, filed on Nov. 15, 2018.

(51) Int. Cl.
| | |
|---|---|
| *G05D 1/00* | (2006.01) |
| *G08G 5/00* | (2006.01) |
| *B64C 39/02* | (2006.01) |
| *B61B 13/10* | (2006.01) |

(52) U.S. Cl.
CPC ......... *G05D 1/0022* (2013.01); *B64C 39/024* (2013.01); *G08G 5/0013* (2013.01); *G08G 5/0069* (2013.01); *G08G 5/0082* (2013.01); *B61B 13/10* (2013.01)

(58) Field of Classification Search
CPC .. G05D 1/0022; B64C 39/024; G08G 5/0013; G08G 5/0069; G08G 5/0082; B61B 13/10
See application file for complete search history.

(56) References Cited

U.S. PATENT DOCUMENTS

| | | | | |
|---|---|---|---|---|
| 5,146,853 | A * | 9/1992 | Suppes | B60L 15/005 |
| | | | | 104/282 |
| 5,950,543 | A * | 9/1999 | Oster | B61B 13/10 |
| | | | | 104/130.05 |
| 2004/0244635 | A1* | 12/2004 | Schlienger | B61B 13/122 |
| | | | | 104/138.1 |
| 2012/0132102 | A1* | 5/2012 | Weiner | B61B 13/10 |
| | | | | 104/138.1 |
| 2016/0229416 | A1* | 8/2016 | Bambrogan | E01B 25/12 |
| 2016/0229417 | A1* | 8/2016 | Bambrogan | B61L 21/10 |
| 2016/0229418 | A1* | 8/2016 | Bambrogan | E01B 2/003 |
| 2016/0229419 | A1* | 8/2016 | Bambrogan | B23P 15/20 |
| 2016/0229646 | A1* | 8/2016 | Bambrogan | B61L 27/04 |

(Continued)

OTHER PUBLICATIONS

Tyll et al., Experimental Studies of Magnetic Levitation Train Aerodynamics, AIAA Journal, vol. 34, No. 12, pp. 2465-2470. (Year: 1996).*

(Continued)

*Primary Examiner* — Russell Frejd
(74) *Attorney, Agent, or Firm* — Thomas Horstemeyer, LLP

(57) ABSTRACT

Disclosed are various embodiments for a high-velocity mobile imaging system. The system can include a tube, which may have at least one wire coil extending for a least a portion of a length of the tube. The system can further include a carriage that is movable along an interior of the tube. The carriage can include a permanent magnet, a sensor, a network communications interface, a processor, a memory, and machine readable instructions stored in the memory that, when executed by the processor, cause the system to capture a reading using the sensor and report the reading to a remote computing device through the network communications interface.

9 Claims, 5 Drawing Sheets

(56) References Cited

U.S. PATENT DOCUMENTS

2016/0230350 A1* 8/2016 Bambrogan ............ B60L 13/03
2017/0080823 A1* 3/2017 Kley ....................... B61B 13/08
2018/0281820 A1* 10/2018 Grip ........................ B61B 13/08
2020/0241137 A1* 7/2020 Choi ........................ B61L 1/02

OTHER PUBLICATIONS

Kim et al, Aerodynamic Characteristics of a Tube Train, Journal of Wind Engineering and Industrial Aerodynamics, pp. 1187-1196. (Year: 2011).*

Deng et al., A High-Temperature Superconducting Maglev-Evacuated Tube Transport (HTS Maglev-ETT) Test System, IEEE Transactions on Applied Superconductivity, vol. 27, No. 6, 8 pgs. (Year: 2017).*

* cited by examiner

HIGH-VELOCITY MOBILE IMAGING SYSTEM

CROSS-REFERENCE TO RELATED APPLICATIONS

This application claims priority to, and the benefit of, U.S. Provisional Patent Application No. 62/767,787, entitled "HIGH-VELOCITY MOBILE IMAGING SYSTEM" and filed on Nov. 15, 2018, which is incorporated by reference as if set forth herein in its entirety.

BACKGROUND

Drones are often used for autonomous imaging and surveillance. Drones have a number of benefits. They can traverse any type of terrain. They can be autonomous or remote controlled. And they can be outfitted with a number of sensors. However, drones have a number disadvantages as well. Battery powered drones often have limited range. Likewise, drones with gasoline powered engines are limited in range based on fuel consumption. Moreover, drones often face speed limitations due to aerodynamic considerations. Moreover, drones present a number of safety concerns. For instance, drones can crash due to malfunctions, technical failure, or loss of fuel or battery power. These crashes can damage property and cause death or injury to those standing underneath.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for an imaging and surveillance system the uses one or more carriages operating within one or more tubes or on top of one or more rails. The carriages may be propelled using various magnetic levitation or magnetic propulsion technologies, allowing for high-speed travel to a destination. The carriages may be equipped with various sensors (e.g., image capture devices, microphones, thermometers, or other sensors) that can capture data or record sensor readings. The carriages may be remote controlled or operate in an autonomous or semi-autonomous fashion. In the following discussion, a general description of the system and its components is provided, followed by a discussion of the operation of the same.

Figure 1:
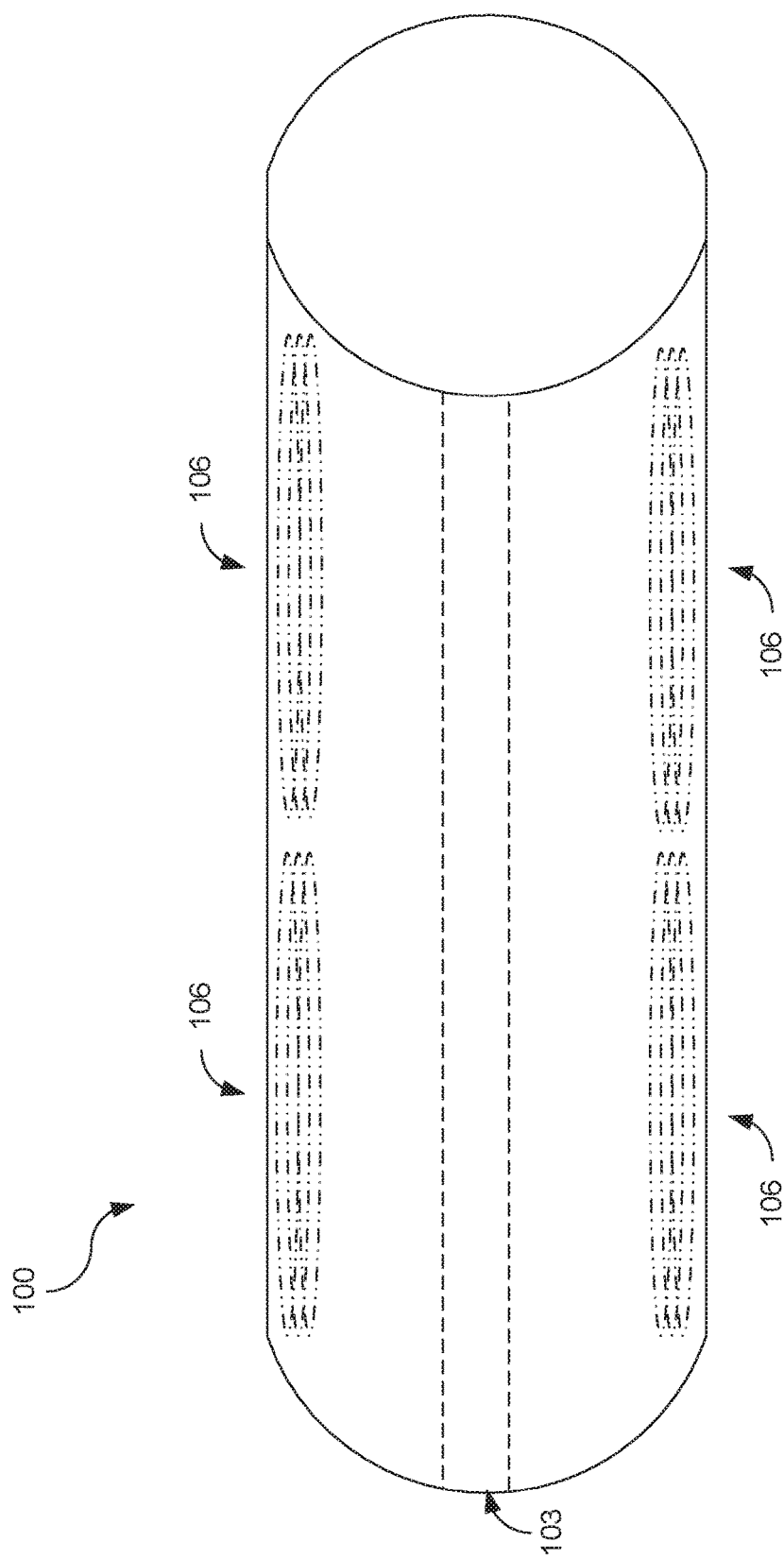
FIG. 1 is a drawing depicting a tube according to one of several embodiments of the present disclosure.

FIG. 1 depicts a version of a tube 100 that can be used in various embodiments of the present disclosure. In some embodiments, the tube 100 may be may made of a flexible material, such as crosslinked polyethylene (PEX), high-density polyethylene (HDPE) or similarly flexible materials. In other embodiments, the tube 100 may be made of a rigid material, such as metal, concrete, or a similar material. In some embodiments of the present disclosure, a translucent or transparent section 106 may be integrated into the wall of the tube 100. In some instances, there may be multiple translucent or transparent sections 103 integrated into the tube 100.

A number of wire coils 106 may also be located along an interior surface of the tube 100. Each wire coil 106 may be part of a pair of wire coils 106 that are located opposite of each other. Each wire coil 106 may be electrically connected to a power source or power supply. When a current is applied to a wire coil 106, the wire coil 103 may act as an electro magnet. As a result, the wire coils 106 can provide for an electromagnetic suspension or electrodynamic suspension of an object located within the tube 100.

In some implementations, the wire coils 106 may be connected to one or more electrical power sources. The electrical power sources may in turn be configured to selectively apply a current to individual wire coils 106 to suspend an object within the tube 100 and/or to propel an object within the tube 100.

In some embodiments of the present disclosure, the tube 100 may also be depressurized, resulting in a vacuum or near vacuum state. As a result, air resistance and friction forces are minimized, allowing for higher speed travel of objects propelled through the tube 100.

Figure 2:
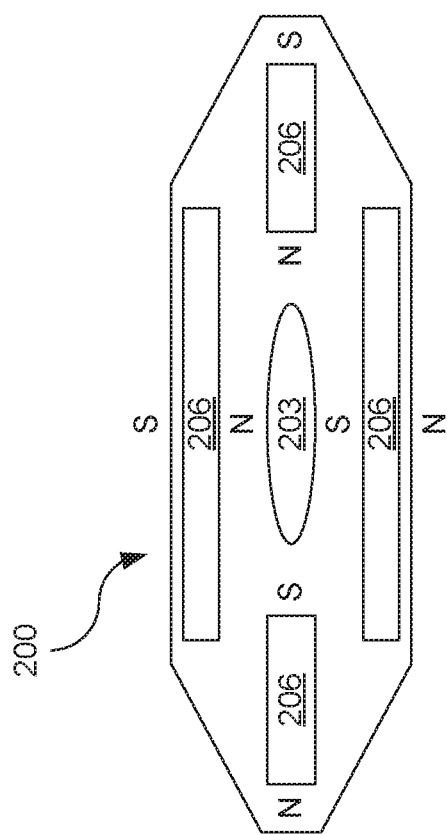
FIG. 2 is a drawing of a carriage according to one of several embodiments of the present disclosure.

FIG. 2 depicts an example implementation of a carriage 200 for use in the tube 100 according to various embodiments of the present disclosure. The carriage 200 may include one or more sensors 203 as well as one or more permanent magnets 206. Example orientations of the poles of the permanent magnets 206 are depicted. However, other orientations may be used according to various embodiments of the present disclosure.

The sensor 203 may be located on an exterior surface of the carriage 200. For example, if the sensor 203 were a camera, then the sensor 203 would be placed on an exterior surface in order to allow the camera to capture images through the translucent or transparent sections 103 of the tube 100. Many different types of sensors 203 may be used to address particular scenarios. For example, sensors 203 could include microphones, image capture devices (e.g., photographic cameras, video cameras, three-dimensional cameras, infrared cameras, etc.), or other types of sensors. The permanent magnets 206 can be aligned in order to allow for the carriage 200 to be suspended by and propelled by the wire coils 106 within the tube 100, allowing for high-speed travel of the carriage 200 within the tube 100.

Figure 3:
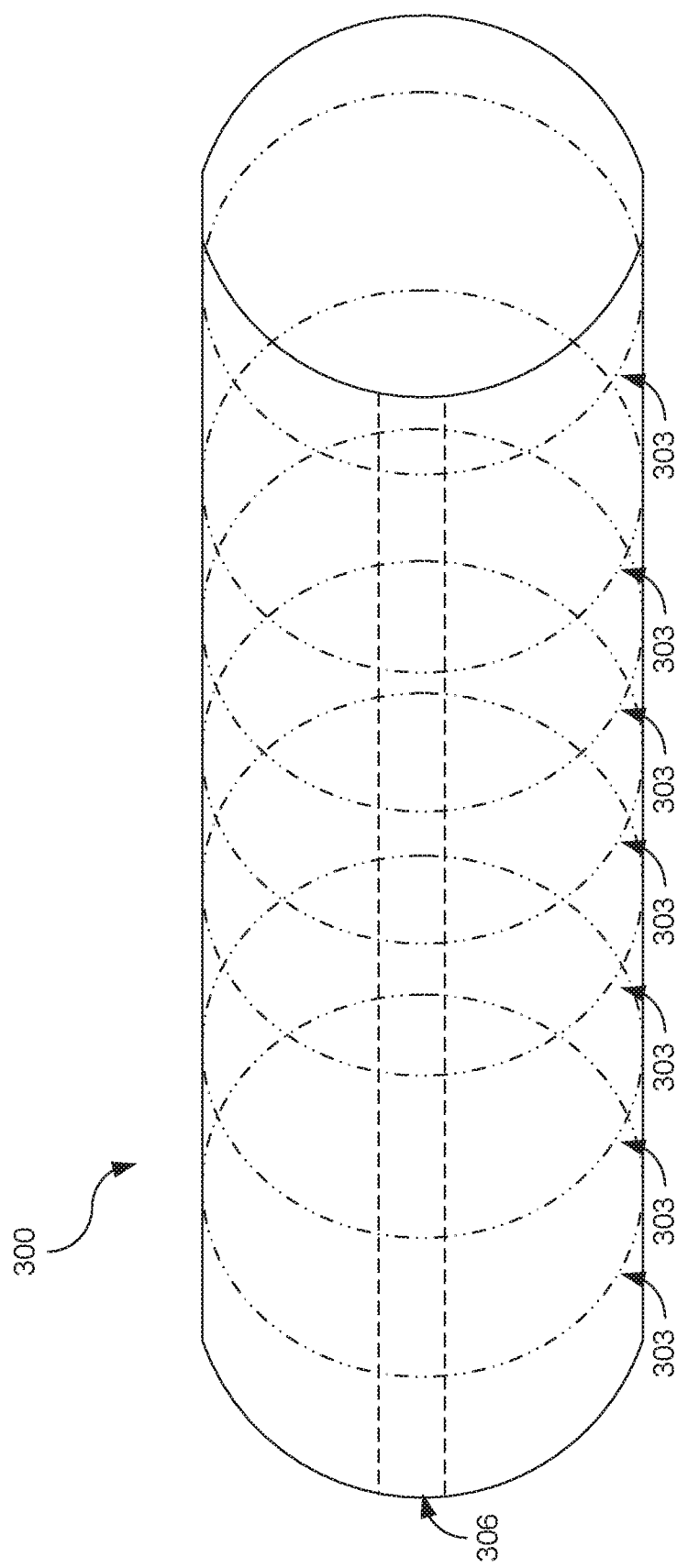
FIG. 3 is a drawing depicting a tube according to one of several embodiments of the present disclosure.

FIG. 3 depicts another version of a tube 300 according to various embodiments of the present disclosure. In this embodiment, the tube 300 can have a series of wire coils 303 wrapped around the tube 100. In some embodiments, the wire coils 303 may be formed from a single wire repeatedly wrapped around the length of the tube 300. In other embodiments, the wire coils 303 may be formed from separate wires or from a set of wires. For example, every other wire coil 303 may be formed from a first wire running the length of the tube, while the remaining wires coils 303 may be formed from a second wire running the length of the tube 300.

Different arrangements of wires may be used to provide for alternative approaches to controlling the magnetic fields generated by the wire coils 303. In those embodiments that use a single wire to form the wire coils 303, the direction of the current flowing through the wires may be reversed in order to change the direction or polarity of the magnetic field generated by the wire coils 303. In those embodiments where multiple wires are used to form sets of wire coils 303, currents can be applied selectively to individual wires to induce magnetic fields from individual ones or individual sets of wire coils 303.

In some implementations, the tube 300 may also have one or more translucent or transparent sections 306. The translucent or transparent sections 306 may be integrated into the wall of the tube 300.

In some embodiments of the present disclosure, the tube 300 may also be depressurized, resulting in a vacuum or near vacuum state. As a result, air resistance and friction forces are minimized, allowing for higher speed travel of objects propelled through the tube 300.

Figure 4:
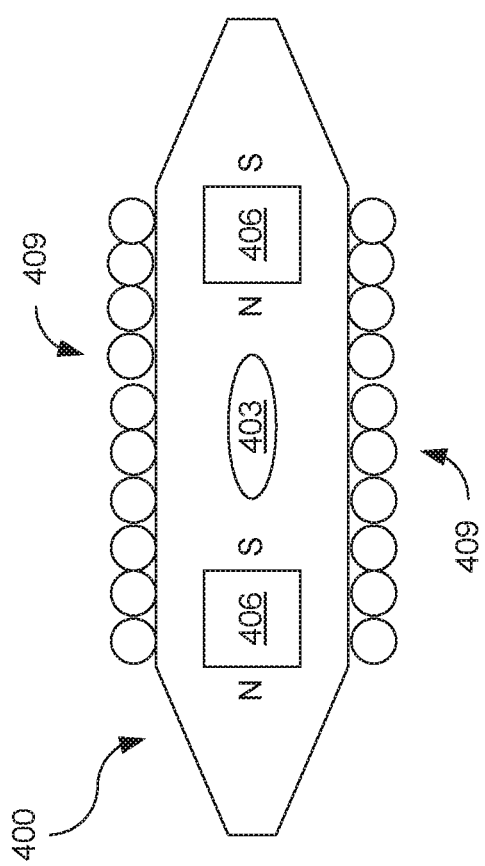
FIG. 4 is a drawing of a carriage according to one of several embodiments of the present disclosure.

FIG. 4 depicts another example implementation of a carriage 400 for use in the tube 300 according to various embodiments of the present disclosure. The carriage 400 may include one or more sensors 403 as well as one or more permanent magnets 406. Example orientations of the magnetic poles of the permanent magnets 406 are depicted. However, other orientations may be employed according to various embodiments of the present disclosure. In addition, the carriage 400 may also include one or more rolling members 409 (e.g., wheels or similar devices). When an electric current is applied to one or more wire coils 303, the magnetic field induced by the current interacts with the permanent magnets 406 to propel the carriage 400 along the interior of the tube 300.

The sensor 403 may be located on an exterior surface of the carriage 400. For example, if the sensor 403 were a camera, then the sensor 403 would be placed on an exterior surface in order to allow the camera to capture images through the translucent or transparent sections 306 of the tube 300. Many different types of sensors 403 may be used to address particular scenarios. For example, sensors 403 could include microphones, image capture devices (e.g., photographic cameras, video cameras, three-dimensional cameras, infrared cameras, etc.), or other types of sensors.

Figure 5:
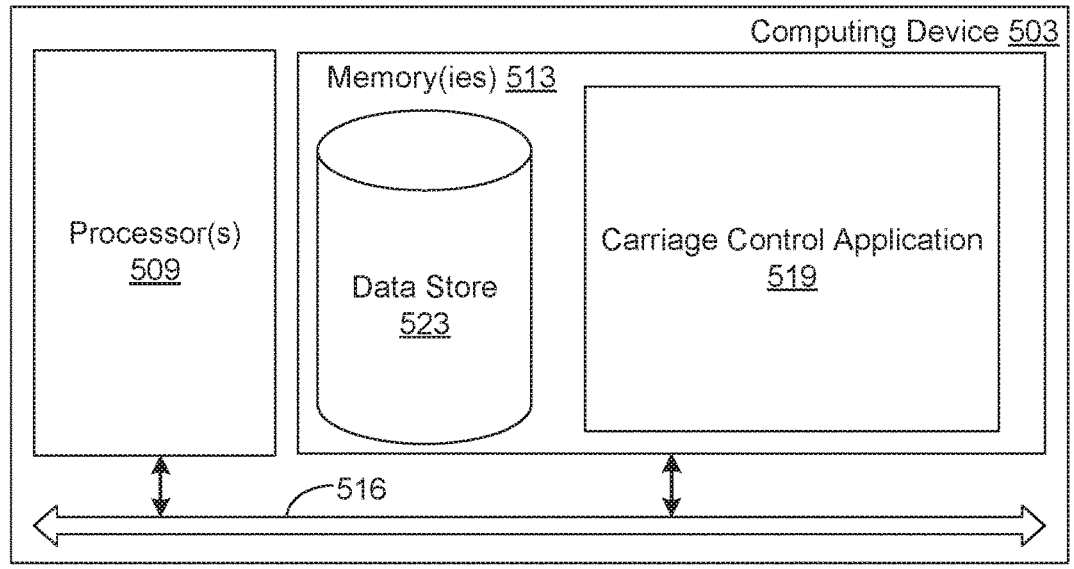
FIG. 5 is a schematic block diagram that provides one example illustration of a computing device in data communication with various components of the present disclosure.
Figure 5:
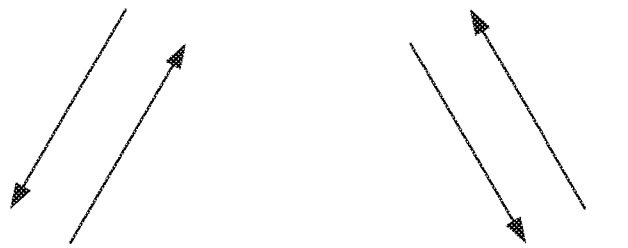
Figure 5:
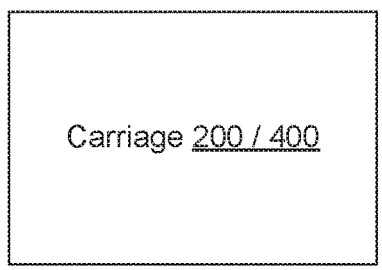
Figure 5:
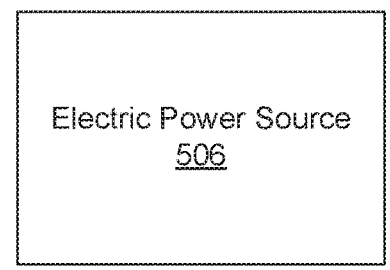

With reference to FIG. 5, shown is a schematic block diagram of a computing device 503 in data communication with a carriage 200 or a carriage 400 and an electric power source 506. Accordingly, the carriage 200/400, the computing device 503, and the electric power source 506 may each have a network interface, which may operate wirelessly (e.g., using radio, satellite, cellular, or WI-FI transmissions) in some embodiments, that connects each component to a network. The computing device 503 includes at least one processor circuit, for example, having a processor 509 and a memory 513, both of which are coupled to a local interface 516. To this end, each computing device 500 may include, for example, at least one server computer or like device. The local interface 516 may include, for example, a data bus with an accompanying address/control bus or other bus structure as can be appreciated.

Stored in the memory 513 are both data and several components that are executable by the processor 509. In particular, stored in the memory 513 and executable by the processor 509 are a carriage control application 519, and potentially other applications. Also stored in the memory 513 may be a data store 523 and other data. In addition, an operating system may be stored in the memory 513 and executable by the processor 509.

The carriage control application 519 includes a number of machine readable instructions that cause the computing device to perform various functions. For example, the carriage control application 519 can maintain data communication with a carriage 200/400. This can allow the carriage control application 519 to track the current location of the carriage 200/400 and store the current location in the data store 523. This can also allow the carriage control application 519 to send commands to the carriage 200/400 (e.g., capture sensor readings, take photographs, report current location, etc.) and receive responses or reports from the carriage 200/400 (e.g., sensor readings, audio, video, photographs, current location, current velocity, etc.). The carriage control application 519 can also send commands to an electric power source 506 in order to control the propulsion of the carriage 200/400 through a tube 100/300. For example, the carriage control application 519 could send a command to an electric power source 506 to apply a current to a wire, thereby inducing a magnetic field in a respective wire coil 106/303 that propels the carriage 200/400. Similarly, the carriage control application 519 could send a command to the electric power source 506 or another electric power source to reverse the direction of the electric current or to apply an electric current to another set of wire coils 106/303 in order to slow the speed of the carriage 200/400 or bring the carriage 200/400 to a stop.

The electric power source 506 may be any source of electric power that includes a switch or similar capability to connect a wire forming a wire coil 106/303 to a circuit. This could be a battery coupled to a switch, a connection to an electric grid that includes a switch, or a generator with a switch. The electric power source 506 can also include a network interface to allow for data communication with the computing device 503.

It is understood that there may be other applications that are stored in the memory 513 and are executable by the processor 509 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 513 and are executable by the processor 509. In this respect, the term "executable" means a program file that is in a form that can ultimately be run by the processor 509. Examples of executable programs may be, for example, a compiled program that can be translated into machine code in a format that can be loaded into a random access portion of the memory 513 and run by the processor 509, source code that may be expressed in proper format such as object code that is capable of being loaded into a random access portion of the memory 513 and executed by the processor 509, or source code that may be interpreted by another executable program to generate instructions in a random access portion of the memory 513 to be executed by the processor 509, etc. An executable program may be stored in any portion or component of the memory 513 including, for example, random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory 513 is defined herein as including both volatile and nonvolatile memory and data storage components. Volatile components are those that do not retain data values upon loss of power. Nonvolatile components are those that retain data upon a loss of power. Thus, the memory 513 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 509 may represent multiple processors 509 or multiple processor cores and the memory 513 may represent multiple memories 513 that operate in parallel processing circuits, respectively. In such a case, the local interface 516 may be an appropriate network that facilitates communication between any two of the multiple processors 509, between any processor 509 and any of the memories 513, or between any two of the memories 513. The local interface 516 may include additional systems designed to coordinate this communication, including, for example, performing load balancing. The processor 509 may be of electrical or of some other available construction.

Although the carriage control application 519 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the carriage control application 519, that includes software or code can be embodied in any non-transitory computer-readable medium for use by or in connection with an instruction execution system such as, for example, a processor 509 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the carriage control application 519, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 503.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a tube comprising:
     at least one wire coil extending for at least a portion of a length of the tube; and
     a translucent or transparent section extending lengthwise continuously along the tube;
   a carriage movable along an interior of the tube, the carriage comprising:
     a permanent magnet;
     a sensor aligned with the translucent or transparent section of the tube;
     a network communications interface;
     a processor;
     a memory; and
     machine readable instructions stored in the memory that, when executed by the processor, cause the carriage to:
       capture a reading using the sensor; and
       report the reading to a remote computing device through the network communications interface.

2. The system of claim 1, wherein the machine readable instructions, when executed by the processor, further cause the system to receive a command through the network communications interface, the command comprising an instruction to capture the reading using the sensor.

3. The system of claim 1, wherein the sensor comprises a microphone.

4. The system of claim 1, wherein the sensor comprises a photographic camera.

5. The system of claim 1, wherein the sensor comprises a video camera.

6. The system of claim 1, wherein the tube is a flexible tube.

7. The system of claim 1, wherein the machine readable instructions, when executed by the processor, further cause the system to receive a command through the network communications interface, the command comprising an instruction to apply a current to a wire, thereby inducing a magnetic field in a respective wire coil that propels the carriage.

8. The system of claim 1, wherein the machine readable instructions, when executed by the processor, further cause the system to receive a command through the network communications interface, the command comprising an instruction to apply an electric current to a wire coil to slow the carriage or bring the carriage to a stop.

9. The system of claim 1, wherein the machine readable instructions, when executed by the processor, further cause the system to receive a command through the network communications interface, the command comprising:
  an instruction to apply an electric current to a wire coil to slow the carriage or bring the carriage to a stop; and
  an instruction to capture the reading using the sensor.

* * * * *